March 1, 1949.  W. R. KEY  2,463,393
LAWN RAKE
Filed July 19, 1946  2 Sheets-Sheet 1

Inventor
William R. Key
by Frederick E. Bromley

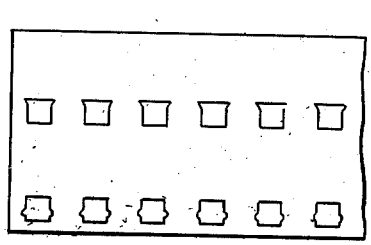 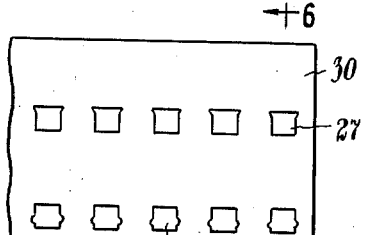 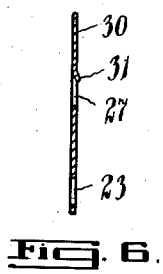
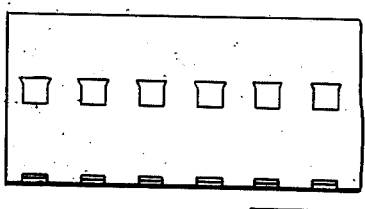 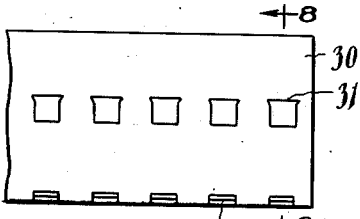 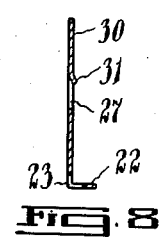
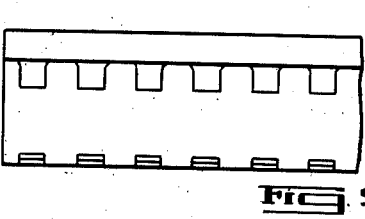 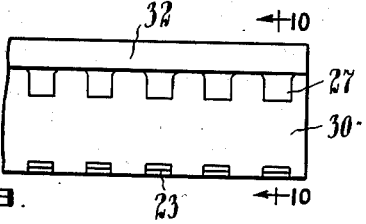 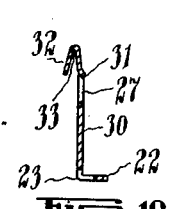
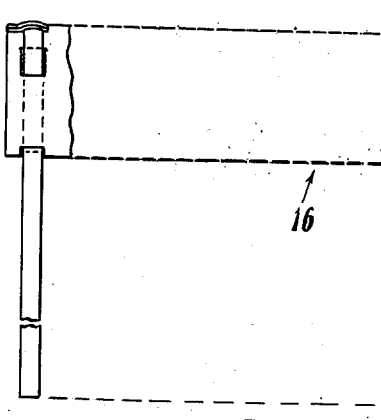 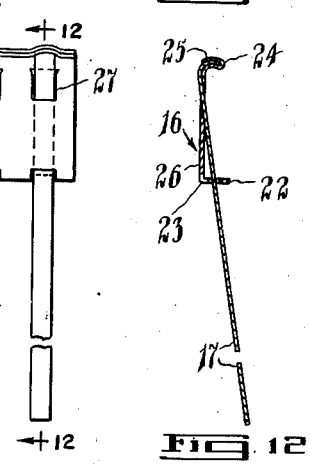

Patented Mar. 1, 1949

2,463,393

UNITED STATES PATENT OFFICE 2,463,393

LAWN RAKE

William R. Key, Toronto, Ontario, Canada

Application July 19, 1946, Serial No. 684,740

1 Claim. (Cl. 56—400.17)

My invention appertains to lawn rakes of the spring-toothed type possessed of a rigid head or frame and a plurality of resilient teeth or tines secured thereon.

A general object of my invention is the provision of a sturdy and serviceable rake of this character which is light in weight and which, by virtue of its construction, will effectively gather cut grass, leaves and other light material without damage to a lawn.

Another object is to provide a rake of the class referred to which comprises a toothed frame formed as a sheet metal stamping which in the course of manufacture is adapted to have the teeth inserted therein by automatic machinery, the teeth being secured in place by a final deforming operation.

Another object is to provide an improved means of securing the teeth on the rake frame whereby they are free to flex, and still another object resides in the process of manufacturing the frame and applying the teeth thereto.

An important feature of the invention is that it enables a lawn rake to be manufactured at low cost.

The preferred embodiment of the invention is illustrated in the accompanying drawing along with the process of manufacture thereof.

In the drawing:

Fig. 5 is a plan view of the perforated blank from which the frame for the teeth is made.

Fig. 6 is a cross section on line 6—6 thereof.

Fig. 7 is a plan view of said blank showing the perforated front edge bent to form a flange.

Fig. 8 is a cross section thereof taken on line 8—8.

Fig. 9 is a plan view of said blank with a return-bent rear edge portion for receiving the rear ends of the teeth in the assembly operation.

Fig. 10 is a cross section thereof taken on line 10—10.

Fig. 11 is a plan view showing the frame completely formed and the teeth secured thereto.

Fig. 12 is a cross section on line 12—12 thereof.

Figure 1:
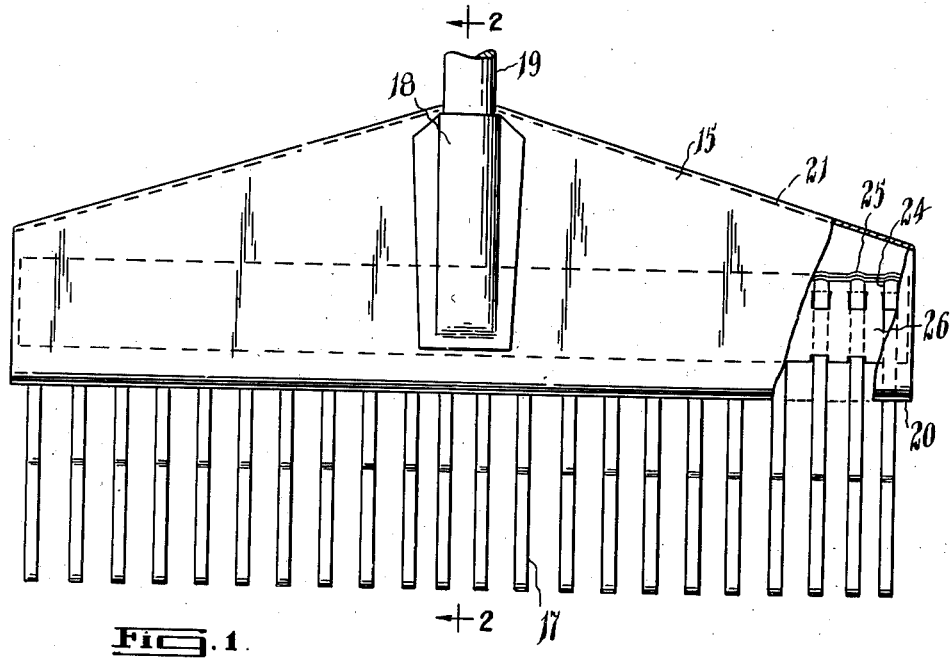
Fig. 1 is a top plan view of the rake head partly broken away to show how the teeth are disposed in the frame member.
Figures 2, 3, 4:
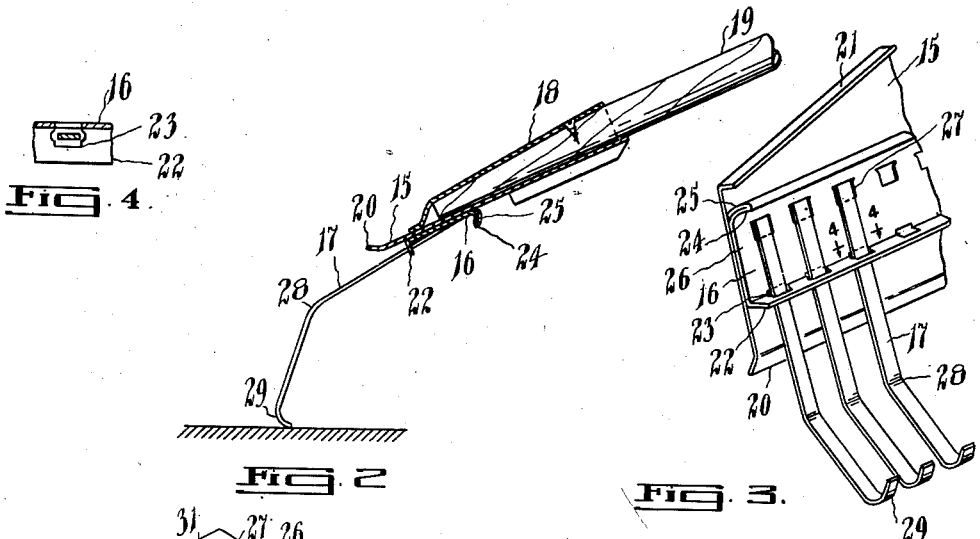
Fig. 2 is a cross section on line 2—2 of Fig. 1.
Fig. 3 is a fragment of the rake head viewed in perspective from the underside.
Fig. 4 is a sectional detail taken on line 4—4 of Fig. 3.

In carrying out the invention I provide a rake head comprising a base plate 15 and a frame 16 attached thereto for carrying the teeth or tines 17. Said base plate is made of stiff sheet metal and is supplied with a socket 18 for an ordinary handle, indicated at 19. The front edge 20 of the base plate is stiffened preferably by bending it upwardly at a suitable angle as shown in Figs. 2 and 3. The rear edge 21 of the base plate is similarly stiffened by its being bent over in a downward direction at a right angle, as will be clearly seen from an inspection of Fig. 3.

Said frame 16 is a channel-shaped plate fashioned from sheet metal by suitable dies in several operations as will be later recounted in detail. This frame extends transversely of said head and is secured, as by spot welding, to the bottom face of the base plate 15, the channel-forming flanges being out-turned so as to project downwardly from said base plate.

The front channel-forming flange, denoted by 22, is formed with a longitudinal series of spaced openings 23 for said teeth or tines 17. The rear channel-forming flange, denoted by 24, is provided with an outward return-bent edge portion 25, and the back portion 26 of the channel frame is formed with a longitudinal series of spaced openings 27 for said teeth or tines 17.

Figure 12A:
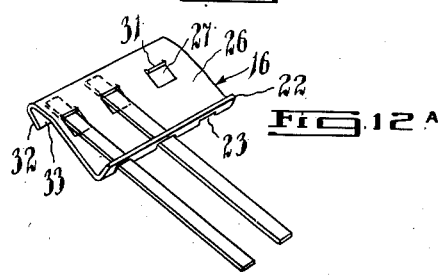
Fig. 12A is a fragmentary perspective view showing how the teeth are assembled on the frame before the return-bent rear portion is closed on the rear ends of the teeth and reversely bent over to secure them in place.

Said teeth are fashioned from a flat strip of spring metal loosely inserted through said openings 23 at a downward angle with their rear end portions projected through said openings 27 and locked in the rear flange 24 in a deformed condition, as best shown in Fig. 12. By this arrangement, said teeth have seating contact with the front edges of the openings 27 which retains them downwardly of the openings 27 so that they have free play in said openings 23 for yielding movement in the use of the rake. Said teeth are bent downwardly at an obtuse angle intermediate of their length as at 28 and their distal ends are curved inwardly as at 29 in order to most effectively gather material in a raking operation.

Having described the construction and arrangement of the improved rake head, the process of manufacturing the frame 16 and method of locking the teeth 17 therein will now be recounted. This frame is stamped from a strip of material in a plurality of operations by means of suitable dies—not shown since they are of a known character. The strip blank, indicated by the numeral 30 in Figures 5 to 10, inclusive, is pierced to provide said front row or series of openings 23 and said rear row or series of openings 27 for the teeth 17. The pierced blank in its flat condition is shown in Figs. 5 and 6, and it will be noted that the rear edge portions of the openings 27 are struck up to form lips 31 which guide the rear ends of the teeth into these openings in the assembly operation.

With reference to Figs. 7 and 8, it will be seen that in a subsequent operation the front edge portion of said blank is bent over to form said front flange 22 with the openings 23 therein. By means of another deforming operation the rear edge portion is return bent as at 32 to provide a substantially V-shaped trough 33 at the opposite side of the blank to that on which said front flange 22 is formed. By reference to Figs. 9 and 10, it will be seen that said trough is located immediately adjacent to the rear openings 27 and that said lips 31 lead to the trough 33.

The blank is now placed in a machine which automatically inserts the teeth 17 and cuts them from a coiled ribbon of suitable material, which machine does not form a part of the present invention. In the inserting operation the teeth 17 first enter the front openings 23 and are angularly directed to pass through the rear openings 27 so that their rear ends enter the trough 33. When the partly completed frame 16 and the teeth are assembled they are subjected to a deforming operation which compresses the trough to bind the rear ends of the teeth therein and at the same time reversely bends over the rear edge portion of the frame along with the ends of the teeth in order to form the flange 24 with its return-bent portion which securely retains the teeth in place, as indicated in Figs. 11 and 12. The teeth are now bent to proper form and the frame 16 is affixed to the base plate 15 by a spot welding operation.

The herein disclosed manufacturing process can be carried out expeditiously and the invention provides an exceedingly sturdy and rugged rake of an improved construction.

What I claim is:

A rake head comprising a base plate having a front edge portion which is upwardly bent to form a lip, a transverse frame plate of a channel shape in cross section secured to said base plate at the under side thereof and rearwardly spaced from said lip, said frame plate having front and rear flanges which form its channel shape, said frame plate also being provided with a lengthwise series of apertures adjacent to said rear flange, said front flange having a lengthwise series of holes aligned with said apertures, a series of tines of flat springy material inserted in said apertures and said holes to extend outwardly below said lip, said holes being of a depth sufficient to permit said tines to move to and away from said lip, and means rigidly securing the rear ends of said tines to said frame plate whereby said tines are held in relaxed positions away from said lip.

WILLIAM R. KEY.

REFERENCES CITED

The following references are of record in the file of this patent:

UNITED STATES PATENTS

| Number | Name | Date |
| --- | --- | --- |
| 1,304,436 | Withington | May 20, 1919 |
| 1,831,009 | Kimber | Nov. 10, 1931 |
| 1,970,616 | Montan | Aug. 21, 1934 |
| 2,039,771 | Bishop | May 5, 1936 |
| 2,156,480 | Owen | May 2, 1939 |
| 2,294,157 | Brooke | Aug. 25, 1942 |
| 2,321,246 | Rocquin | June 8, 1943 |

FOREIGN PATENTS

| Number | Country | Date |
| --- | --- | --- |
| 56,764 | Norway | June 29, 1936 |